March 11, 1930.   D. M. SOLENBERGER   1,749,786
PISTON RING
Filed March 28, 1927
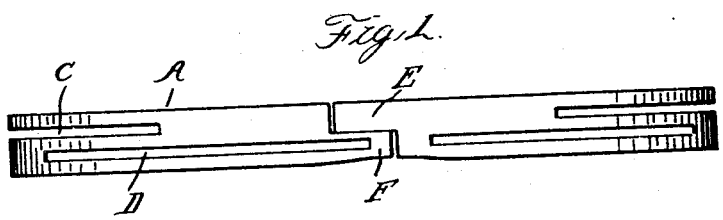
Fig. 1.
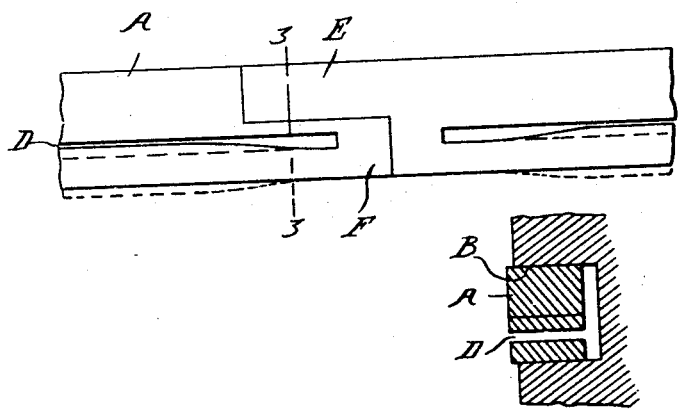
Fig. 2.
Fig. 3.
Inventor
Dean M. Solenberger
By Whittemore Hulbert
Whittemore & Belknap
Attorneys Patented Mar. 11, 1930

1,749,786

UNITED STATES PATENT OFFICE

DEAN M. SOLENBERGER, OF CLEVELAND, OHIO, ASSIGNOR TO THE SIMPLEX PISTON RING CO. OF AMERICA, INC., OF CLEVELAND, OHIO, A CORPORATION OF OHIO

PISTON RING

Original application filed April 16, 1923, Serial No. 632,290. Divided and this application filed March 28, 1927. Serial No. 179,122.

The invention relates to axially expansible piston rings and the present application is a divisional of my co-pending application. Serial No. 632,290 filed April 16, 1923. In the parent application various specific constructions of rings are shown and described to all of which axial resiliency is imparted by slotting the ring circumferentially. The ring is also rendered radially expansible by trans-splitting the same and to seal the joint at this trans-split the adjacent ends preferably overlap each other.

In the use of the rings of this type they are placed in ring grooves which are less in width and it is therefore necessary that all portions of the ring including the overlapping ends should be capable of axial contraction. One way in which this may be accomplished is to extend one of the circumferential slots across the split. Another way is to terminate the slots short of the split leaving solid overlapping ends and in then reducing the width of these solid end portions to that of the ring groove. This latter construction forms the subject matter of the present application for patent as shown in the accompanying drawings in which Figure 1 is a side elevation of the ring.

Figure 2 is an enlarged side elevation of the overlapping end portions of the ring showing the same contracted to fit the ring groove and in dotted lines expanded to normal position.

Figure 3 is a cross section on line 3—3 of Figure 2.

A is the piston ring which is first formed of an axial dimension which is greater than the width of the ring groove B. This ring is then sawed or otherwise circumferentially slotted preferably with overlapping staggered slots as indicated at C and D. E and F are overlapping tongues or end portions of the ring which seal the joint. As shown, these ends being in contact with each other and being solid at the ends are incapable of axial contraction and therefore must be reduced to the width of the ring groove. This may be accomplished by grinding or otherwise removing the material from the ring on opposite sides of the split so that when the ring is contracted as shown in Figure 2 all portions will fit within the ring groove.

While I have shown but one construction it is obvious that any construction in which the end portions of the ring adjacent to the split are solid may be made to fit the ring groove and without interference with the axial expansibility of other portions of the ring.

What I claim as my invention is:

A sealing ring comprising a trans-split ring member having a normal axial dimension in excess of that of the ring groove and provided with overlapping series of circumferentially extending slots rendering all portions of said ring with the exception of portions adjacent the split axially compressible, said portions adjacent to the split being reduced in axial dimension to be insertable in and to substantially fit the ring groove when said portions opposite the slots are axially compressed to fit the groove.

In testimony whereof I affix my signature.

DEAN M. SOLENBERGER.